Patented Sept. 17, 1946

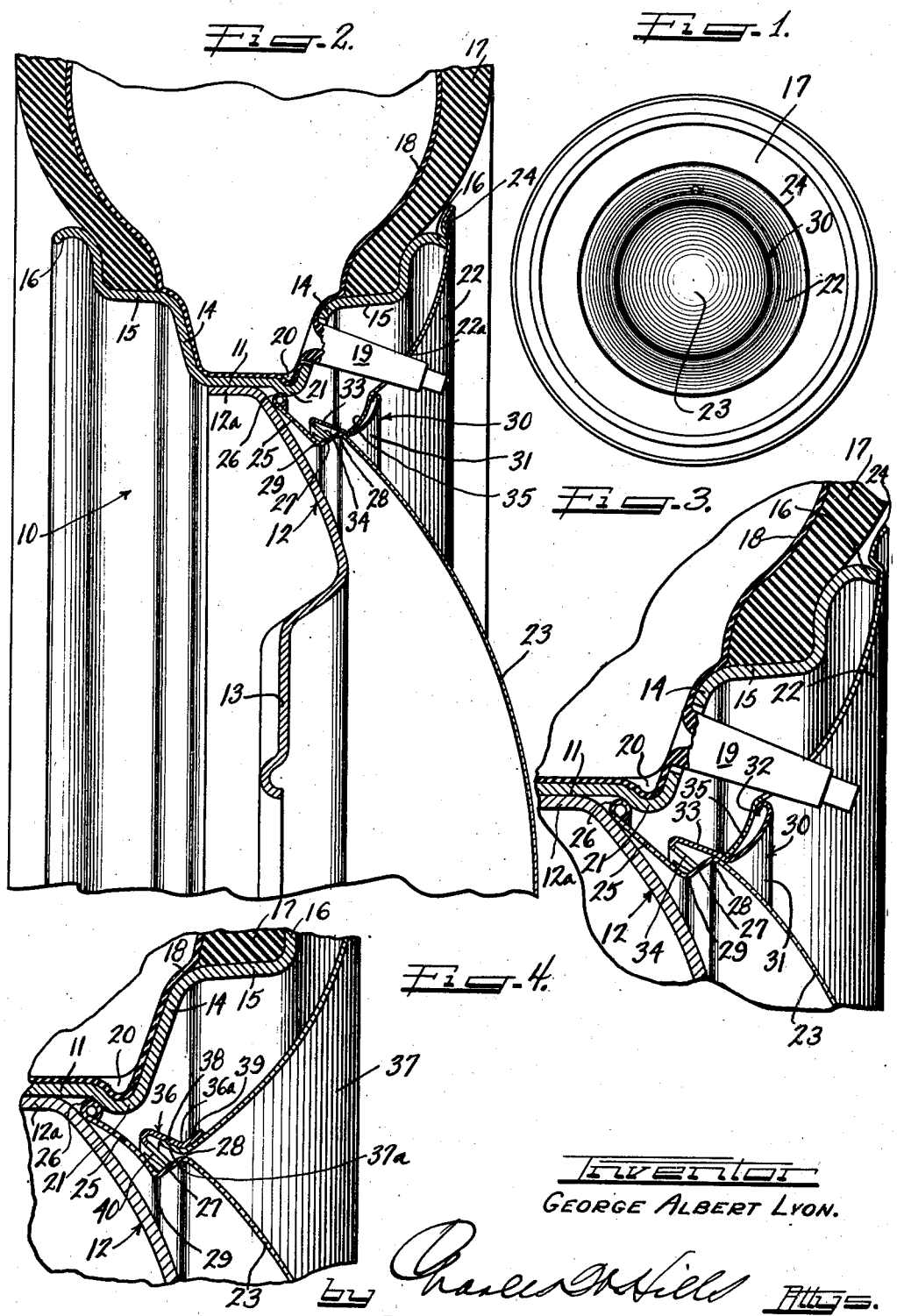

2,407,669

UNITED STATES PATENT OFFICE 2,407,669

WHEEL STRUCTURE

George Albert Lyon, Allenhurst, N. J.

Application November 1, 1943, Serial No. 508,462

7 Claims. (Cl. 301—37)

This invention relates to an improved wheel structure and is directed more particularly to an improved cover assembly therefor.

It is an important object of the present invention to provide improved retaining means for maintaining a circular cover over the outer side of a wheel structure.

It is a further object of the invention to provide an improved retaining arrangement for maintaining a cover over the outer side of a wheel structure wherein the cover includes an outer annular part and a central hub cap simulating part, the latter being secured directly to the wheel structure and being arranged to retainingly receive an attachment element which in turn retainingly receives the outer cover portion to maintain the same in concentric alignment with the wheel structure and over the outer side thereof, this retaining means being arranged for easy-on, hard-off attachment to the central cover part.

It is another object of the invention to provide for a wheel structure an improved cover assembly including an outer annular part constructed preferably from synthetic sheet plastic material or the like, whereby it possesses physical characteristics enabling it to be self-supporting as to form and yet locally, temporarily, resiliently flexible, whereby it may be distorted to render the rear side thereof accessible and yet will immediately snap back into normal configuration when the distorting pressures are relieved therefrom, this outer annular part being secured to a central hub cap simulating cover part by means of a relatively rigid retaining annulus having a portion disposed over a radially inner part of the annular cover member and a portion retainingly secured to the central hub cap portion.

In accordance with the general features of the present invention, there is provided herein a wheel structure having a tire rim of the drop center type and a central load bearing portion, and a cover member for disposition over the outer side of the wheel, said cover including a central, preferably metallic, hub cap simulating circular member detachably secured directly to the wheel structure by resilient engagement with generally radially inwardly extending protuberances formed on a flange of the wheel rim and providing radially outwardly facing indentations for receiving portions of an inner tube of the tire, and a radially outer annular cover portion, there being a circular groove formed in the central cover member and a retaining annulus for engagement in said groove in easy-on, hard-off relationship therewith, said retaining annulus having a part extending generally radially outwardly and adapted to retainingly receive the radially inner margin of the annular cover member, this radially extending part of the retaining member in one form of the invention extending over the outer surface of the radially inner margin of the outer cover member to ornament the same. In one form of the invention as shown herein the radially outer cover member is provided with a cross-sectional expanse of such configuration and size that it extends from radially outwardly of the radial outward extremity of the tire rim, inwardly to a point beyond the junction between the tire rim and the central load bearing portion of the wheel and is provided with a cross-sectional configuration simulating that of a tire in the tire rim, thereby to give the appearance of being a continuation thereof and a part thereof and further giving the appearance of being a white side wall of a massive tire mounted on the wheel when colored white.

Other objects and advantages of the invention will become apparent from the following description and accompanying drawing, in which:

Figure 1 is a side elevational view of a wheel structure embodying my invention;

Figure 2 is an enlarged, fragmentary, cross-sectional view of a wheel embodying the structure shown in Figure 1;

Figure 3 is an enlarged, fragmentary, cross-sectional view of a portion of the structure shown in Figure 2; and Figure 4 is an enlarged, fragmentary, cross-sectional view of a modified form of my invention.

It will, of course, be understood that various details of construction may be varied through a wide range without departing from the principles of this invention and it is, therefore, not the purpose to limit the patent granted hereon otherwise than necessitated by the scope of the appended claims.

In the form of the invention shown herein the wheel structure includes a drop center type tire rim 10 having a base flange 11 to which may be secured by welding or riveting or the like, a generally axially inwardly extending skirt or flange 12a of a central load bearing portion 12.

The central load bearing portion 12 is further provided with a central bolt-on flange 13 which may be secured by bolts or in any suitable manner to a suitable appurtenance of the vehicle such as the brake drum or the like, whereby the wheel is maintained upon the vehicle.

The tire rim 10 is further provided with opposite side wall flanges 14, opposite intermediate flanges 15 and opposite edge portions 16, between which may be disposed a pneumatic tire 17 having an inner tube 18 provided with a valve stem 19 which is aligned with and extends through a suitable aperture in the respective side wall flange 14.

To the end that the inner tube 18 may be interlockingly engaged with the tire rim to prevent circumferential slippage thereof during rotation of the wheel and also to the end that the cover assembly may be secured to the wheel structure, the tire rim 10 is provided at the axially outer junction of the base flange 11 and the adjacent side wall 14, with a plurality of radially outwardly facing indentations 20 which afford radially inwardly extending protuberances 21. Thus it will be seen that when the inner tube 18 is inflated adjacent portions thereof will be pressed tightly into the indentations 20 as shown in the drawing so that the tube will resist circumferential, frictional sliding movement relative to the tire rim. In other words, the tire is prevented from creeping relative to the rim during rotation thereof.

The cover assembly shown herein includes an outer annular ring portion 22 and a central crowned circular portion 23. Preferably the annular portion 22 is constructed from sheet synthetic plastic material or the like, whereby it possesses physical characteristics enabling it to be self-supporting as to form and yet locally, temporarily, resiliently flexible so that the outer marginal part thereof may be deflected axially outwardly to render the rear side thereof accessible. Furthermore with this construction it will be seen that the cover may be accidentally abraded or indented by striking against curbing or the like, under which circumstances it will flex temporarily and yet will immediately resume the cross-sectional configuration shown when the distorting pressures are relieved therefrom.

The cover member 22 is furthermore provided with a cross-sectional configuration generally simulating the side wall of the tire 17 whereby it gives the appearance of being a continuation thereof and, in fact, gives the appearance of being a white side wall of the tire when colored white, thus giving the effect of a massive tire on a wheel structure of minimum dimensions and obviating the necessity for the provision of a white side wall of the tire during the molding thereof.

It will also be seen that in the present embodiment the cover member 22 is provided with a generally radially outwardly extending outer edge flange 24 which extends beyond the edge portion 16 of the tire rim to substantially conceal the junction between the tire rim and the tire thus to augment the appearance of the cover as a continuation of the side wall of the tire.

The central hub cap simulating cover member 23 is preferably formed from sheet metal and is provided at the radially outer margin thereof with a generally axially inwardly, radially outwardly, obliquely disposed flange 25 which terminates in a rolled peripheral bead 26.

It is contemplated that the material from which the cover 23 is formed will be of such a nature that the flange 25 and bead 26 will be somewhat resilient so that when the bead 26 is formed so that the diameter of the circle described by the outer extremity thereof is slightly larger than that of the circle described by the inner extremity of the protuberances 21, the bead may be urged axially inwardly relative to the wheel structure so that it is distorted from its round configuration as it passes the humps or peaks of the protuberances, whereupon it again springs into circular configuration to be detachably yet retainingly held by the axially inner sides of the protuberances and thus wedge against the adjacent portion of the outer surface of the central load bearing portion 12 of the wheel structure. Thus it will be seen that by mere manual pressure to force the cover member 23 axially inwardly against the wheel structure, the retaining bead thereof will be resiliently urged into the position shown in the drawing, whereby the cover is maintained securely on the wheel structure behind the protuberances 21 and in wedged engagement against the adjacent portion of the central load bearing portion 12 of the wheel structure.

It will be understood of course that many different expedients may be utilized for securing the cover member 23 to the wheel structure without departing from the spirit of the present invention; however, the above described construction is preferred since the inner tube 18 is locked in position against creeping as previously described.

The cover member 23 is further formed so that the junction between the central crowned portion thereof and the peripheral flange 25 constitutes a generally axially inwardly, radially inwardly, obliquely disposed integral, intermediate flange 27. It will be seen that the flange 27 forms, with the crowned portion of the cover member 23, a circular peak or hump 28 which extends generally radially outwardly and a groove 29 which opens generally radially outwardly.

In the construction shown in Figures 1, 2 and 3, the outer annular cover member 22 is assembled on the cover member 23 by means of an intermediate retaining annulus 30 which includes an outer portion 31 that extends generally radially outwardly and is provided with an axially outwardly convex configuration, the radially outer margin thereof being turned back upon the portion 31 to form a flange 32 which presents to the cover member 22 a rounded, non-abrading surface as will be seen presently.

The radially inner portion of the curvate annulus 31 terminates in a generally axially inwardly extending flange 33 which in turn terminates in a generally axially outwardly, radially inwardly, obliquely disposed set of resilient fingers 34 arranged to bitingly engage the adjacent portion of the surface of the flange 27 of the cover member 22 in a manner to be explained presently.

The cover member 22 which, as will be seen from Figures 2 and 3, may be provided with an aperture 22a for receiving the outer end of the tire valve stem 19, has a radially inner marginal portion 35 arranged to be disposed behind the body portion 31 of the annulus with the radially inner edge thereof abutting the adjacent portion of the surface of the flange 33 of the retaining annulus. Preferably the cover member 22 is attached to the retaining annulus 30 in the manner aforementioned, before the retaining member is secured to the wheel structure and this operation is accomplished by drawing the annulus 22 over the rear side of the retaining member 30 and elastically snapping the radially inner peripheral edge of the cover over the axially inner side of the flange 33 of the retaining member. With this construction it will be seen that these parts are then securely maintained in operative relationship as shown in the drawing.

When the parts 22 and 30 are arranged in the position shown in the drawing and described above and the cover member 23 has been forced home into its retained position upon the wheel as shown in the drawing, the cover assembly may be completed by alignment of the cover 22 concentrically with the wheel and the aperture 22a thereof with the valve stem whereupon movement of the parts 22 and 30 axially inwardly of the cover member 23 causes the resilient fingers 34 to be forced radially outwardly so that they pass the circular peak 28 of the cover member 23.

Thereafter, upon continued inward movement of the radially outer part 22 of the cover assembly, the ends of the teeth 34 ride axially inwardly along the inner surface of the flange 27 of the cover member 23 until the axially outer part of the flange 33 of the retaining member 30 abuts the cover member 23 in the vicinity of the peak 28 thereof. When in this position the outer part of the cover assembly is maintained against axial movement in either direction by the abutment of the flange 33 with the cover 23 and by the biting engagement of the ends of teeth 34 into the adjacent portion of the surface of the flange 27 of the cover member 23.

Thereafter, if the operator desires to obtain access to the rear side of the cover 22, it is merely necessary that the flange 24 thereof be grasped and flexed temporarily, locally downwardly. If, however, it is found necessary to remove the entire cover assembly, the operator need merely flex the cover member 22 as described above and insert the point of a pry-off tool between the tire rim 10 and the bead 26 at a point between two of the protuberances 21, whereupon downward movement of the pry-off tool with a portion of the tire rim 10 as a fulcrum, will cause the adjacent portion of the bead 26 to move axially outwardly and radially, resiliently inwardly to pass the protuberances 21.

From the foregoing it will be seen that there is provided herein a multi-part cover assembly in which the central hub cap simulating part is securely maintained on the wheel structure in snap-on, pry-off relationship thereto while the radially outer part of the cover is secured to the aforementioned cover member in easy-on, hard-off relationship, by an intermediate, rigidifying retaining element which additionally serves as an ornamenting or bordering instrumentality at the junction of the cover parts.

It will be understood, of course, that preferably the retaining annulus 30 is formed from thin sheet steel, either regular or stainless and may be provided either with a highly polished finish on the part 31 thereof or, if desired, that part may be enamelled to give the color effect desired.

In the construction shown in Figure 4, the central hub cap simulating cover member and the wheel and tire constructions are the same as those shown in Figure 2 and accordingly, similar parts are identified by similar numerals.

In this construction the retaining annulus 36 is arranged to engage with the inner surface of the outer annular cover member and includes a generally axially outwardly extending annular part comprising an arm 38 terminating in a flange 39 which is formed to extend generally radially outwardly and axially outwardly. The inner edge of the annular portion 38 terminates in generally radially inwardly, axially outwardly extending, obliquely disposed resilient teeth 40 which, like the teeth 34 of the construction of Figures 2 and 3 are arranged to bitingly engage the adjacent portion of the surface of the flange 27 of the central hub cap simulating member 23.

The cover member 37 in the construction of Figure 4 possesses generally the attributes described in conjunction with the cover member 22 of the construction of Figures 1, 2 and 3. This cover member 37, however, is provided at the radially inner margin thereof with a circular portion which is cross-sectionally shaped to conform to the configuration of the radially inner surface of the portions 38 and 39 of the annular retaining member, whereby, by virtue of the radially inwardly extending peaks 36a formed between the portions 38 and 39, the cover member 37 is securely maintained upon the retaining member 36 when the inner peripheral margin thereof is elastically snapped over the parts 38 and 39 thereof.

With the foregoing structure it will be seen that the radially inner margin of the body part of the cover member 37 abuts the outer surface of the portion 39 of the retaining annulus to prevent axial inward movement of the cover 37 relative to the wheel structure whereas the radially inner flange 37a thereof abuts the radially inner surface of the portion 38 of the retaining member 36 to prevent axial outward movement of the cover 37 relative to the wheel structure.

What I claim is:

1. As an article of manufacture, a multi-part, unitary cover assembly including an outer annular cover portion, a central circular hub cap simulating cover portion and a retaining annulus disposed therebetween and arranged for retaining engagement with said cover portions to maintain the same as a unitary circular structure, said retaining annulus including a portion arranged to overlie the radially inner margin of said annular cover portion and a portion arranged to retainingly engage an intermediate part of said central circular hub cap simulating cover portion to maintain the parts together, said central circular hub cap simulating cover portion including a generally axially inwardly extending, resilient, portion arranged for detachable engagement with a part of the wheel structure with which it is associated.

2. In a wheel structure including a tire rim having a base flange and side wall flanges, and a central load bearing portion secured to said base flange, there being circumferentially spaced, radially inwardly extending protuberances along the junction between said base flange and one of said side wall flanges, said protuberances affording radially outwardly facing indentations in the tire rim for receiving the adjacent portion of a tire disposed in said rim, a cover assembly for disposition over the outer side of said wheel including a radially outer annular part arranged to extend radially inwardly from the edge portion of said tire rim to a point beyond the junction of said rim with said central load bearing portion, and means for detachably securing the annular cover part to the wheel structure including a central hub cap simulating cover member having a radially outer edge formed to resiliently engage behind said circumferentially spaced protuberances in snap on engagement therewith, said circular cover member being further provided with an intermediate portion formed to afford a generally radially inwardly, axially inwardly disposed annular flange, and a retaining annulus for detachably engaging the radially inner portion of said annular cover part, said retaining annulus including a part provided with a plurality of generally axially outwardly, radially inwardly, extending resilient teeth arranged to bitingly engage said annular flange of the central cover member for maintaining the annular cover part, the circular cover member and the retaining member together as a unitary structure.

3. In a wheel structure including a tire rim and a central load bearing portion, a cover assembly for disposition over the outer side of the wheel structure including a radially outer annular portion and a central circular hub cap simulating portion, means on said central hub cap simulating cover portion for detachably engaging with the wheel structure to maintain the cover assembly thereon, and retaining means for maintaining the annular cover portion and the central hub cap simulating cover portion including an annular retaining member having an axially outer part arranged to extend radially outwardly over the axially outer surface of the radially inner margin of said annular cover portion and having an axially inner portion formed to provide a plurality of resilient finger members arranged to retainingly engage an intermediate portion of the central hub cap simulating portion to maintain the cover portions together as a unitary structure.

4. In a wheel structure including a tire rim and a central load bearing portion, a cover assembly for disposition over the outer side thereof including an outer annular portion, a central circular portion and an annular retaining member disposed therebetween for securing the same together as a unitary structure, said central circular cover portion including a radially outer part arranged for detachable engagement with the wheel structure and an intermediate part formed to provide an intermediate, annular, generally axially inwardly, radially inwardly extending, obliquely disposed flange, said retaining member comprising a portion arranged to retainingly engage the radially inner marginal part of the annular cover portion and including a part arranged to provide generally radially inwardly, axially outwardly extending, obliquely disposed finger members adapted to bitingly engage the adjacent portion of the surface of said annular flange on the central cover portion when urged axially inwardly thereover.

5. In a wheel structure including a tire rim and a central load bearing portion, a multi-part cover assembly adapted for disposition over the outer side of the wheel structure and including an outer annular portion formed from synthetic plastic sheet material and having characteristics enabling it to be self-supporting as to form and yet locally, temporarily, resiliently flexible and a central circular, relatively rigid hub cap simulating cover portion, said last named cover portion including a generally axially inwardly extending, resilient marginal part arranged for detachable engagement with a portion of the wheel structure and also including an intermediate part formed to provide a generally axially inwardly, radially inwardly extending annular flange, and retaining means for maintaining said cover portions together including an annulus having an axially outer part arranged to overlie the outer side of the radially inner margin of said annular cover portion and an axially inner part including a generally axially inwardly, radially outwardly extending flange provided with a turned back portion including a plurality of axially inwardly radially outwardly extending resilient fingers arranged for biting engagement with the annular flange on said circular cover portion to retain the cover portions as a unitary structure.

6. In a wheel structure including a tire rim and a central load bearing portion, a multi-part cover assembly adapted for disposition over the outer side of the wheel structure and including an outer annular portion formed from synthetic plastic sheet material and having characteristics enabling it to be self-supporting as to form and yet locally, temporarily, resiliently flexible and a central circular, relatively rigid hub cap simulating cover portion, said last named cover portion including a generally axially inwardly extending, resilient marginal part arranged for detachable engagement with a portion of the wheel structure and also including an intermediate part formed to provide a generally axially inwardly, radially inwardly extending annular flange, and retaining means including an annular portion formed to provide a circular, radially inwardly facing intermediate hump and a portion bent back thereon to provide a plurality of generally axially outwardly, radially inwardly extending resilient fingers for bitingly engaging said flange on the central cover portion, said annular cover portion having at the radially outer part thereof a marginal portion shaped to conform to the configuration of said first named portion of the retaining member thereby to be securely retained thereon.

7. In a wheel structure including a tire rim and a central load bearing portion, a cover assembly for disposition over the outer side thereof including an outer annular portion and a central circular portion, said central circular portion being provided with a radially outer edge arranged for detachable engagement with the wheel structure and an intermediate stepped portion, retaining means including a part for retainingly engaging the radially inner margin of said annular cover portion and including a part arranged for retainingly, resiliently engaging the surface of the step in said central cover portion, said retaining means including an intermediate portion arranged to abuttingly engage the axially outer side of the central cover portion at a point disposed axially outwardly of said step, thereby to secure said retaining means against axial movement relative to said central cover portion.

GEORGE ALBERT LYON.